(12) United States Patent
Briane et al.

(10) Patent No.: US 8,803,469 B2
(45) Date of Patent: Aug. 12, 2014

(54) INTERCONNECTION HOUSING WITH AN INVERTER FOR CHARGING A BATTERY OF A MOTOR VEHICLE

(75) Inventors: Benoit Briane, Paris (FR); Serge Loudot, Villiers-le-Bacle (FR)

(73) Assignee: Renault S.A.S., Boulogne-Billancourt (FR)

( * ) Notice: Subject to any disclaimer, the term of this patent is extended or adjusted under 35 U.S.C. 154(b) by 538 days.

(21) Appl. No.: 13/132,727

(22) PCT Filed: Nov. 25, 2009

(86) PCT No.: PCT/FR2009/052295
§ 371 (c)(1),
(2), (4) Date: Sep. 22, 2011

(87) PCT Pub. No.: WO2010/063921
PCT Pub. Date: Jun. 10, 2010

(65) Prior Publication Data
US 2012/0013308 A1    Jan. 19, 2012

(30) Foreign Application Priority Data
Dec. 3, 2008   (FR) ...................... 0806774

(51) Int. Cl.
*H01M 10/46*  (2006.01)
(52) U.S. Cl.
USPC .................................................. 320/104
(58) Field of Classification Search
USPC .................. 320/103, 104, 109, 128
See application file for complete search history.

(56) References Cited

U.S. PATENT DOCUMENTS

| | | | |
|---|---|---|---|
| 3,622,858 A * | 11/1971 | Mitchell | 320/123 |
| 5,581,171 A | 12/1996 | Kerfoot et al. | |
| 8,026,698 B2 * | 9/2011 | Scheucher | 320/136 |
| 2004/0201362 A1 | 10/2004 | Borrego Bel et al. | |
| 2007/0188130 A1 | 8/2007 | Scheucher | |
| 2008/0006491 A1 | 1/2008 | Degoul et al. | |
| 2010/0013438 A1 * | 1/2010 | Anwar et al. | 320/138 |

FOREIGN PATENT DOCUMENTS

| | | |
|---|---|---|
| EP | 1 469 575 | 10/2004 |
| EP | 1 870 978 | 12/2007 |
| JP | 3729617 | 10/2005 |
| WO | WO 2010/089071 A1 | 8/2010 |
| WO | WO 2011/157922 A1 | 12/2011 |
| WO | WO 2012/032241 A2 | 3/2012 |

OTHER PUBLICATIONS

U.S. Appl. No. 12/919,396, filed Aug. 25, 2010, Loudot, et al.
U.S. Appl. No. 12/866,997, filed Jul. 7, 2010, Briane, et al.
International Search Report Issued Mar. 9, 2010 in PCT/FR09/052295 filed Nov. 25, 2009.
French Search Report Issued Jul. 14, 2009 in French Application No. 08 06774 filed Dec. 3, 2008.

* cited by examiner

*Primary Examiner* — Edward Tso
(74) *Attorney, Agent, or Firm* — Oblon, Spivak, McClelland, Maier & Neustadt, L.L.P.

(57) ABSTRACT

An interconnection housing for a motor vehicle, including connection terminals for a battery and connection terminals for an inverter. The housing includes connection terminals for an external electric power supply and outlets for connection to an AC electric motor, such that the battery can be recharged when the external power supply, the inverter, the electric motor, and the battery are all connected simultaneously to the interconnection housing.

12 Claims, 5 Drawing Sheets

INTERCONNECTION HOUSING WITH AN INVERTER FOR CHARGING A BATTERY OF A MOTOR VEHICLE

BACKGROUND

The invention relates to an interconnection housing for a motor vehicle, to a traction device and to a motor vehicle as such including such an interconnection housing. Finally, it relates also to a method of recharging a motor vehicle battery.

DESCRIPTION OF THE RELATED ART

FIG. 1 schematically depicts a conventional motor vehicle 1 provided with an electric power pack. This vehicle comprises a battery of accumulator cells 2 carried on board it and connected to a three-phase motor 3 that drives the wheels 4 in a first, vehicle traction, phase. It additionally comprises a three-phase inverter 5 the function of which is to convert the DC voltage supplied by the battery 2 into an AC voltage needed by the motor 3. The inverter 5 comprises two power supply input terminals D and E connected respectively to the positive and negative poles of the battery 2, as well as three output terminals A, B, C which are connected to three induction windings E1, E2, E3 of the motor 3. Furthermore, the vehicle comprises a charger 6, separate from the other components of the device, and the function of which is to convert the AC voltage supplied by an external power supply 7, generally the mains, into a DC voltage with a view to recharging the battery 2 in a second, vehicle charging, phase.

In order to improve upon the conventional solution above, document FR2738411 describes a solution in which the charger 6 is no longer needed, the charging function being performed by using the components of the inverter 5 and adding a few further components including in particular three switches. This solution is schematically illustrated in FIG. 2 in which notably one switch 8 can be used to modify the configuration of the above electric circuit in order to allow it to operate in battery 2 charging mode, the motor 3 and the inverter 5 being connected to the mains and acting as a charger. This principle is advantageous but difficulties in optimally implementing it within a motor vehicle still remain.

BRIEF SUMMARY

Thus, one object of the invention is to provide a solution which guarantees optimum electrical charging of a battery connected to a motor using an inverter within a motor vehicle.

To this end, the invention rests on an interconnection housing for a motor vehicle, comprising connection terminals for a battery, connection terminals for an inverter, characterized in that it comprises connection terminals for an external electrical power supply, outputs for a connection to an AC electric motor so that the simultaneous connection of an external power supply, of an inverter, of an electric motor and of a battery to the interconnection housing allows the battery to be recharged.

According to one embodiment, the interconnection housing may comprise comprises at least three switches which in a first position offer a configuration in which the interconnection housing can be used in a motor vehicle traction device, and in a second position offer a configuration in which it can be used in a device for recharging a battery.

The interconnection housing may comprise a switch allowing the positive terminal of a battery to be connected either to the terminal of an inverter or to the first outlet for connection to an electric motor, and may comprise two switches allowing two outputs for connection to an electric motor to be connected either to the first output for connection to an electric motor or left only connected to the terminals for an external power supply.

The switch allowing the positive terminal of a battery to be connected either to the terminal of an inverter or to the first output for connection to an electric motor may comprise a first contact intended for connection to the terminal of an inverter, designed for the very high currents encountered in an electric traction phase, and a distinct second contact intended for connection to the first output for connection to an electric motor, designed for the weak currents encountered during a phase of recharging a battery.

The interconnection housing may comprise at least one bistable switch comprising an auxiliary means for locking its contact.

The interconnection housing may comprise at least one switch having at least one auxiliary contact capable of confirming the position of the contacts in one or other of the stable positions.

The interconnection housing may comprise three switches connected to one and the same control means, such as a coil, to ensure simultaneous switching of the switches.

The invention also relates to a traction device for a motor vehicle, comprising a battery, an electric motor, an inverter, characterized in that it comprises an interconnection housing as defined hereinabove.

This interconnection housing may be positioned directly on the electric motor.

The electric motor may be a three-phase motor comprising three induction windings respectively connected to the three outputs of the interconnection housing.

The inverter may comprise three switching arms and a filtering capacitor which are connected to the three induction windings of the electric motor by a three-phase connector.

The invention also relates to a motor vehicle characterized in that it comprises a traction device as defined hereinabove.

Finally, the invention also relates to a method of recharging an electric traction device for a motor vehicle, characterized in that it comprises the following steps:
  connecting an electrical power supply to the terminals of a motor vehicle interconnection housing to which the battery is connected;
  commanding the change of position of three switches within the interconnection housing.

BRIEF DESCRIPTION OF THE DRAWINGS

These objects, features and advantages of the present invention will be explained in detail in the following description of one particular embodiment given nonlimitingly with reference to the attached figures in which.

DETAILED DESCRIPTION

Figure 1:
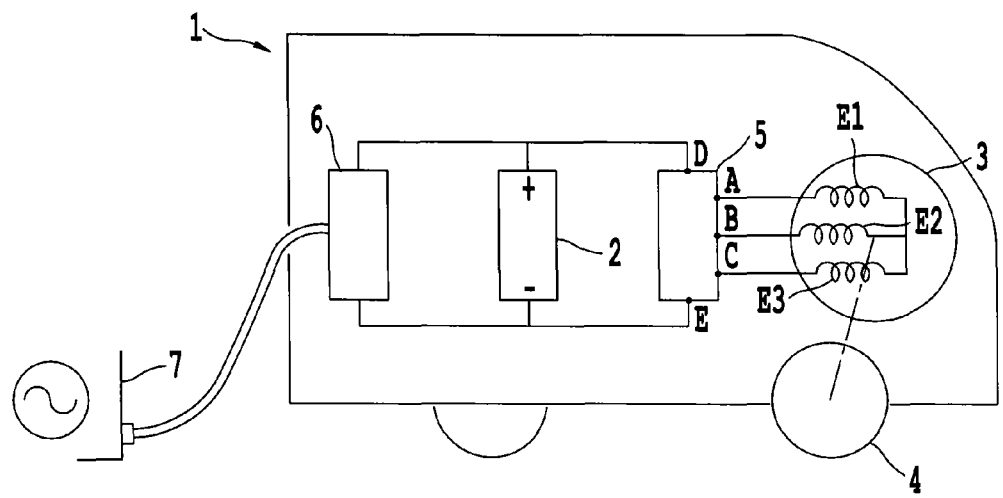
FIG. 1 schematically depicts a motor vehicle according to the prior art.

As has already been explained hereinabove, the same electrical device comprising a battery 2, a three-phase AC motor 3 and an inverter 5, may serve as the basis for implementing not only motor vehicle traction but also the recharging of the battery from the mains, with the notable addition of three special switches. The design of the invention involves housing within one and the same interconnection housing the added electrical components which are accessible via the required output terminals, these more specifically being housed in a single interconnection housing which performs the general function of electrical distribution and electrical protection of the high voltage emanating from the battery, for powering various receivers such as the traction inverter 5, and also other devices that have not been depicted such as the air conditioning, the heating, a 14V DC/DC, etc. This interconnection housing could notably comprise the three switches mentioned hereinabove. The inverter 5 comprises, mounted in parallel between its power supply terminals D and E, three switching arms 18, 19, 20 and a filtering capacitor 21. Each arm 18, 19, 20 comprises, in series, two diode/chopper switch sets (for example, IGBT transistors with their reverse-biased diodes), each diode being mounted in the reverse direction in relation to the normal direction of conduction of each switch. The output terminals A, B, C of the inverter 5 are connected to the mid-points of the arms 18, 19, 20. The inverter 5 is operated by an electronic circuit, not depicted, which controls the closings and openings of the transistors and determines, for each arm 18, 19, 20, the cycles for the chopping of the DC voltage delivered by the battery 2.

Figure 3:
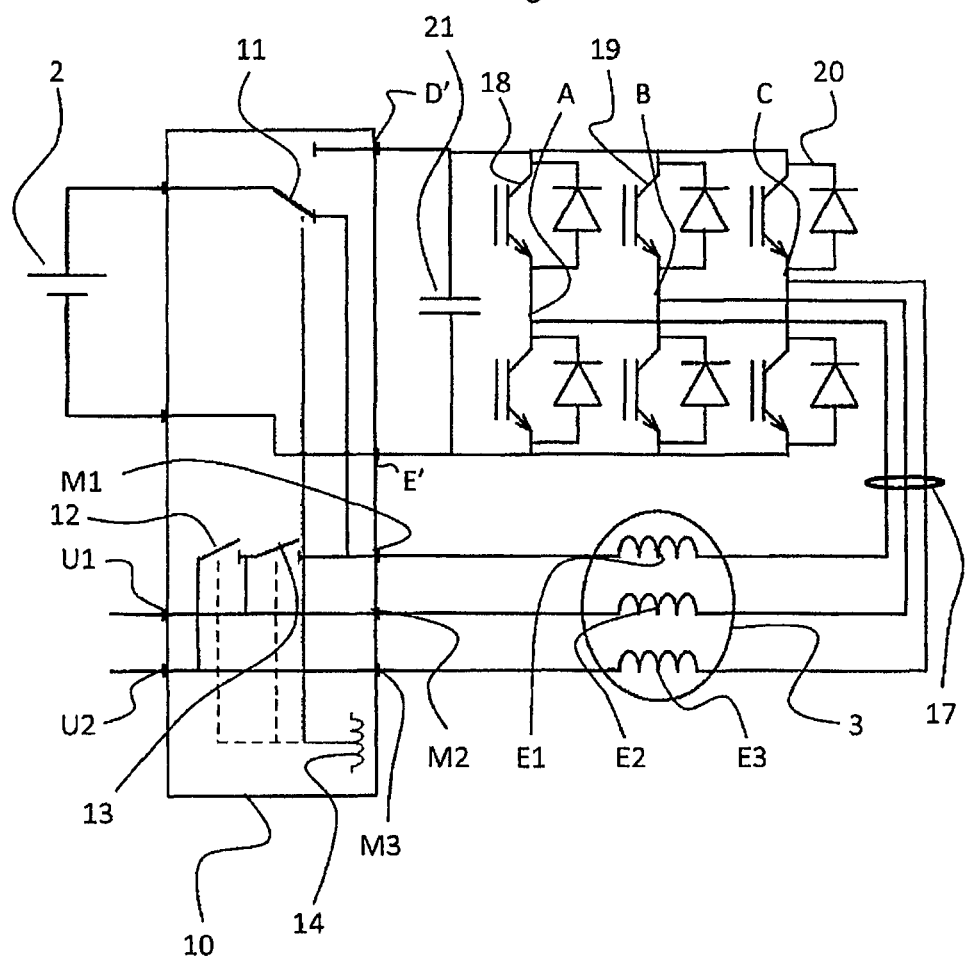
FIG. 3 schematically depicts an electric circuit according to an embodiment of the invention in a battery-charging configuration.

Thus, FIG. 3 illustrates one embodiment of the invention, which rests on an interconnection housing comprising, on the one hand, two distinct inputs for connection to the battery 2 and to the mains 7 via the input terminals U1 and U2 and, on the other hand, two output terminals D', E' which correspond to the input terminals D, E for supplying the inverter 5 with power, and three outputs M1, M2, M3 for the three induction windings E1, E2, E3 of the motor 3 respectively. Three switches 11, 12, 13 are positioned within the interconnection housing 10. The first switch allows the positive terminal of the battery 2 to be connected either to the terminal D' intended for the inverter 5 or to the output M1 connected to the inductor E1. The second switch 12 and the third switch 13 allow the outputs M2 and M3 to be connected either to the output M1 or left connected only to the terminals U1 and U2. These three switches are connected to one single control means 14, such as a coil, to ensure that they switch simultaneously, even in a failure mode.

The interconnection housing is in the form of a casing that forms a fluid tight housing comprising an external electrical interface consisting of connectors.

Figure 2:
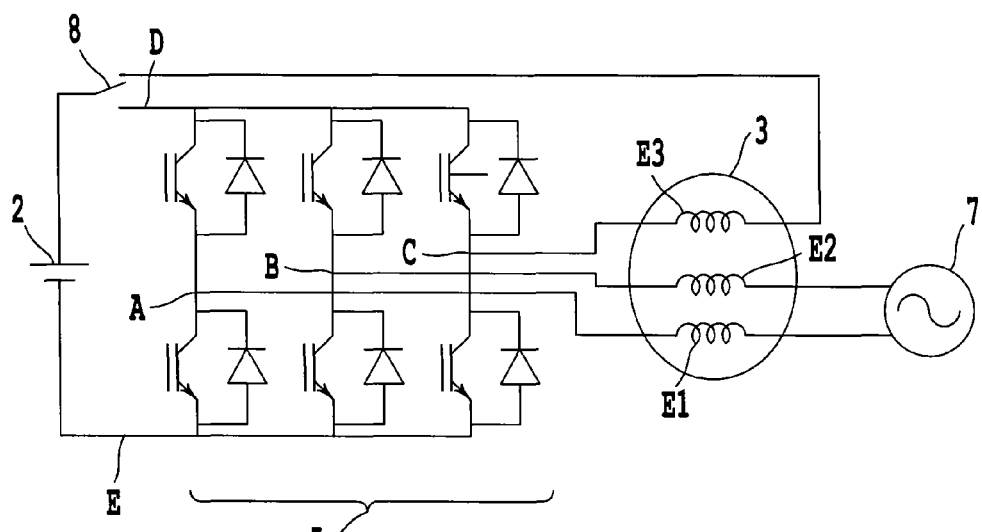
FIG. 2 schematically depicts the electric circuit during the phase of charging the battery according to a solution from the prior art.

The way in which the device works will now be explained. FIG. 3 illustrates the configuration of the battery 2 charging mode. The electrical diagram is in fact equivalent to that of FIG. 2. In this charging mode, the first switch 11 connects the positive terminal of the battery 2 to the winding E1 of the motor 3 via the output M1. The second switch 12 and the third switch 13 are open, allowing the other two windings E2, E3 of the motor 3 to be in direct contact with the terminals U1 and U2 connected up to the mains, not depicted, via the outputs M2 and M3 of the interconnection housing 10.

Figure 4:
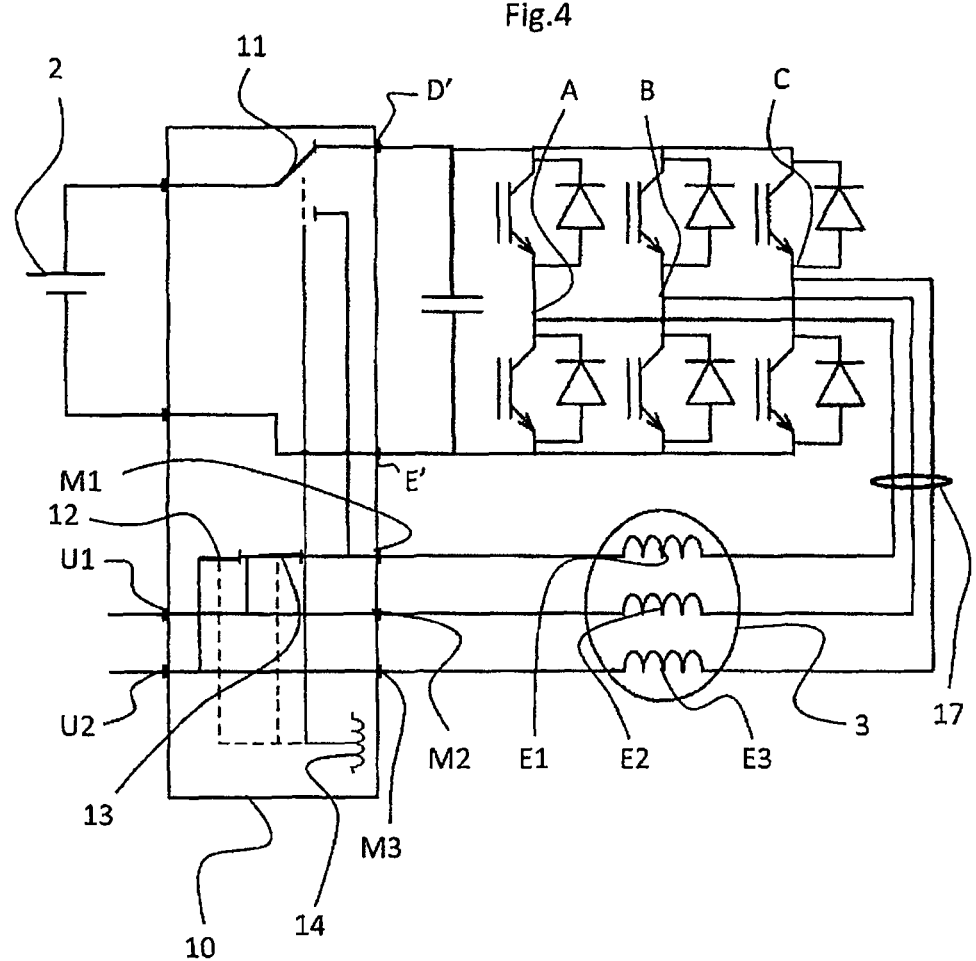
FIG. 4 schematically depicts the same electric circuit according to the embodiment of the invention in a motor vehicle traction configuration.

FIG. 4 illustrates the same device in a vehicle traction position. The three switches 11, 12, 13 have the opposite position to that position of the preceding figure, and the terminals U1 and U2 are naturally no longer connected to the mains. In this configuration, the windings E1, E2 and E3 are in a star configuration.

Figure 5:
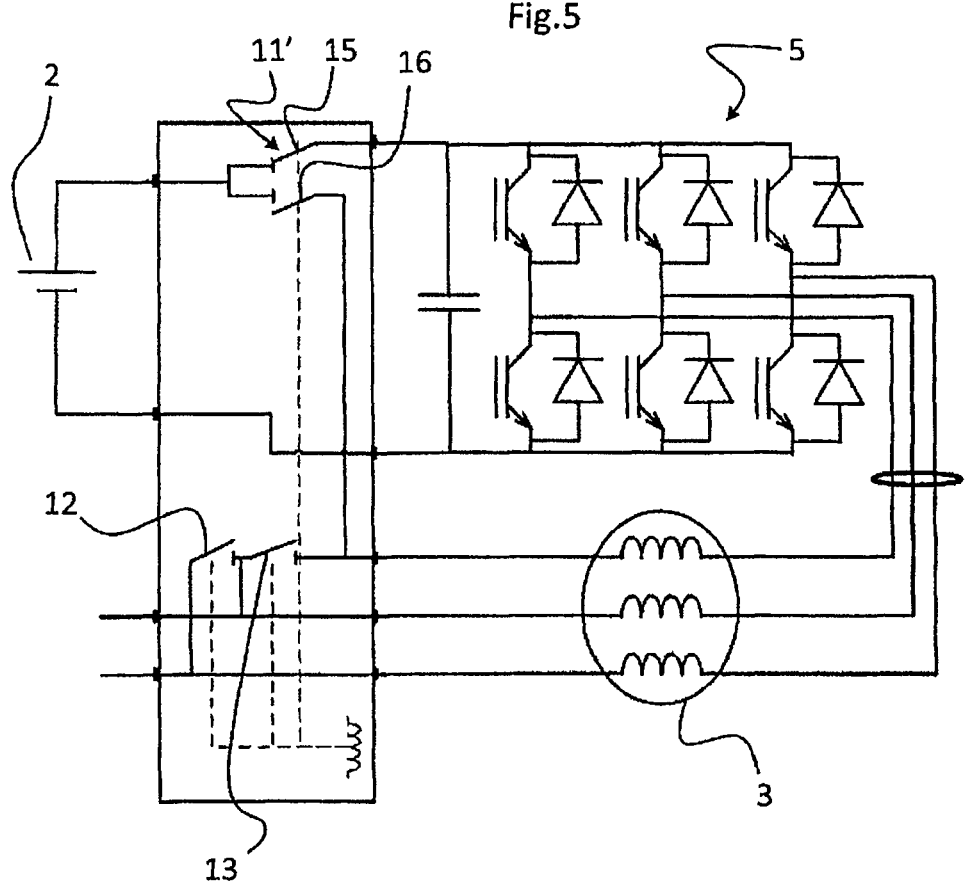
FIG. 5 schematically depicts an alternative form of the embodiment of the invention.

FIG. 5 shows an alternative form of the embodiment of the invention in which the first switch 11 is replaced by a switch 11' that has two distinct contacts 15, 16. The first contact 15 is designed for the very high currents encountered in the electric traction phase, which can be as high as around 200 A, while the second contact 16 is designed for the weak currents encountered during the recharging phase, which are of the order of 25 to 30 A.

One advantageous embodiment involves using a bistable system which keeps the contacts in their position very robustly and with good resistance to vibration, for operational reliability reasons. To do that, the switch may have an auxiliary means for locking the contacts in a given position, preventing opening of contacts by bouncing as a result of vibration. A first embodiment involves adding to the conventional switch structure, of the coil-spring type, a mechanical locking means which is locked at rest and positively driven in such a way as to unlock the contacts before the coil is operated to cause the contacts to change state. One second possible embodiment involves using an electrical actuator capable of moving the contacts and of holding them in position, by dry friction for example. Finally, another embodiment involves creating an auxiliary contact which is able to confirm the position of all of the contacts in one or other of the stable positions and in a transient position, thus limiting the control points. There may be two auxiliary contacts, mechanically secured to the power contacts, that confirm the position of all of the contacts.

Figure 6:
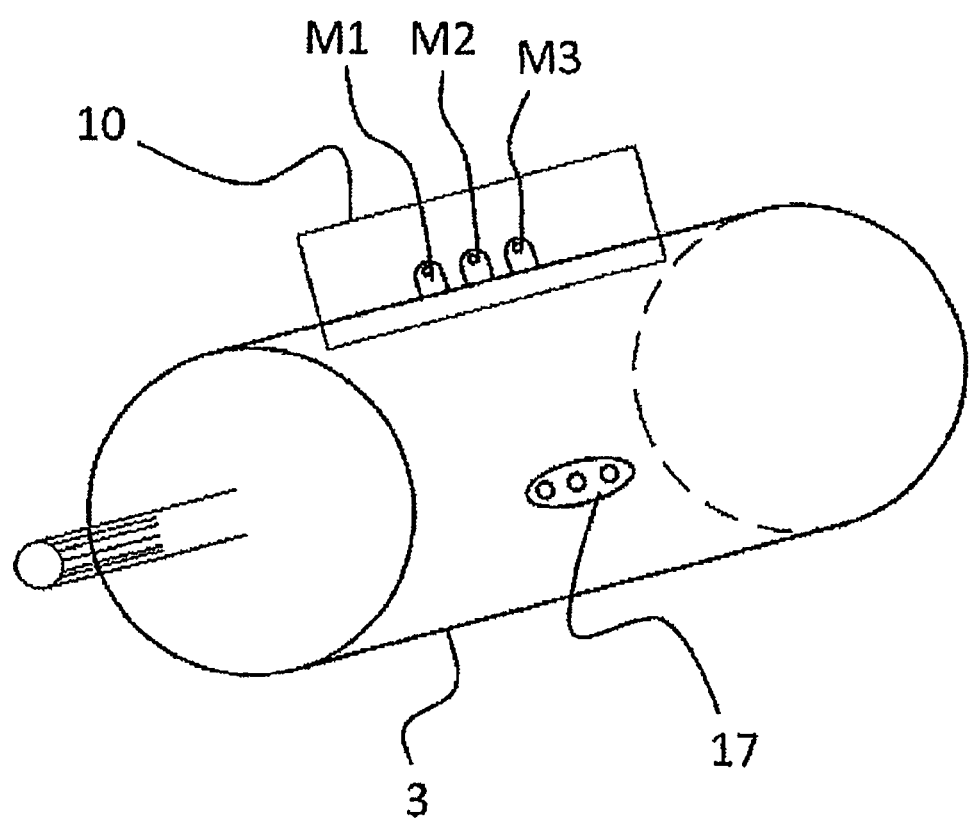
FIG. 6 depicts the positioning of an interconnection housing within a motor vehicle according to one embodiment of the invention.

FIG. 6 illustrates one advantageous arrangement of the interconnection housing 10 on the motor 3. This solution allows the housing to be electrically connected to the motor simply by using busbars, thus for example avoiding the need to use three additional shielded cables with their own fluid tight connectors. At the same time, the three-phase connector 17 that connects the motor 3 to its inverter, not depicted, is unmodified by comparison with a prior art solution.

Finally, the invention also relates to a method of recharging an electric traction device for a motor vehicle, characterized in that it comprises the following steps:
connecting an electrical power supply 7 to the terminals U1, U2 of a motor vehicle interconnection housing;
commanding the change of position of three switches 11, 12, 13 within the interconnection housing.

The invention claimed is:

1. An interconnection housing for a motor vehicle, comprising:
   connection terminals for a battery;
   connection terminals for an inverter;
   connection terminals for an external electrical power supply;
   outputs for a connection to an AC electric motor so that simultaneous connection of the external power supply, of the inverter, of an electric motor, and of the battery to the interconnection housing allows the battery to be recharged; and
   at least three switches that in a first position offer a configuration in which the interconnection housing can be used in a motor vehicle traction device, and in a second position offer a configuration in which the interconnection housing can be used in a device for recharging a battery.

2. The interconnection housing as claimed in claim 1, wherein one of the three switches allows a positive terminal of the battery to be connected either to the terminal of the inverter or to the first outlet for connection to the electric motor, and the other two switches allow two outputs for connection to the electric motor to be connected either to a first output for connection to the electric motor or left only connected to the connection terminals for the external power supply.

3. The interconnection housing as claimed in claim 2, wherein the one switch allowing the positive terminal of the battery to be connected either to the terminal of the inverter or to the first output for connection to the electric motor comprises a first contact intended for connection to the terminal of an inverter, configured for high currents encountered in an electric traction phase, and a distinct second contact intended for connection to the first output for connection to an electric motor, configured for weaker currents encountered during a phase of recharging a battery.

4. The interconnection housing as claimed in claim 1, comprising at least one bistable switch comprising an auxiliary means for locking its contact.

5. The interconnection housing as claimed in claim 1, comprising at least one switch having at least one auxiliary contact capable of confirming a position of the contacts in one or other of stable positions.

6. The interconnection housing as claimed in claim 1, wherein the three switches are connected to one and a same control means, or to a coil, to ensure simultaneous switching of the switches.

7. A traction device for a motor vehicle, comprising:
a battery;
an electric motor;
an inverter; and
an interconnection housing as claimed in claim 1.

8. The traction device for a motor vehicle as claimed in claim 7, wherein the interconnection housing is positioned directly on the electric motor.

9. The traction device for a motor vehicle as claimed in claim 7, wherein the electric motor is a three-phase motor comprising three induction windings respectively connected to three outputs of the interconnection housing.

10. The traction device for a motor vehicle as claimed in claim 9, wherein the inverter comprises three switching arms and a filtering capacitor that are connected to the three induction windings of the electric motor by a three-phase connector.

11. A motor vehicle comprising a traction device as claimed in claim 7.

12. A method of recharging an electric traction device for a motor vehicle, comprising:
connecting an electrical power supply to terminals of a motor vehicle interconnection housing to which a battery is connected; and
commanding a change of position of three switches within the interconnection housing between a first position offering a configuration in which the interconnection housing can be used in a motor vehicle traction device, and a second position offering a configuration in which the interconnection housing can be used in a device for recharging a battery.

* * * * *